US012610393B2

(12) United States Patent
Jang et al.

(10) Patent No.: US 12,610,393 B2
(45) Date of Patent: Apr. 21, 2026

(54) METHOD AND DEVICE FOR SIGNALING ERSP IN WIRELESS LAN SYSTEM

(71) Applicant: LG ELECTRONICS INC., Seoul (KR)

(72) Inventors: Insun Jang, Seoul (KR); Jeongki Kim, Seoul (KR); Jinsoo Choi, Seoul (KR); Namyeong Kim, Seoul (KR); Sunhee Baek, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 349 days.

(21) Appl. No.: 18/271,020

(22) PCT Filed: Jan. 17, 2022

(86) PCT No.: PCT/KR2022/000805
§ 371 (c)(1),
(2) Date: Jul. 5, 2023

(87) PCT Pub. No.: WO2022/158801
PCT Pub. Date: Jul. 28, 2022

(65) Prior Publication Data
US 2024/0090022 A1        Mar. 14, 2024

(30) Foreign Application Priority Data

Jan. 19, 2021    (KR) ........................ 10-2021-0007533
Jan. 25, 2021    (KR) ........................ 10-2021-0009994

(51) Int. Cl.
*H04W 74/04*          (2009.01)
*H04W 74/00*          (2009.01)
*H04W 84/12*          (2009.01)

(52) U.S. Cl.
CPC ......... *H04W 74/04* (2013.01); *H04W 74/002* (2013.01); *H04W 84/12* (2013.01)

(58) Field of Classification Search
CPC ........... H04W 52/0225; H04W 74/002; H04W 74/04; H04W 84/12
See application file for complete search history.

(56) References Cited

U.S. PATENT DOCUMENTS

| | | |
|---|---|---|
| 2016/0345266 A1 | 11/2016 | Park et al. |
| 2017/0195954 A1 | 7/2017 | Ghosh |

(Continued)

FOREIGN PATENT DOCUMENTS

| | | |
|---|---|---|
| EP | 4284107 A1 | 11/2023 |
| WO | 2017119759 A1 | 7/2017 |
| WO | 2017164687 A1 | 9/2017 |

OTHER PUBLICATIONS

Baron et al. "Low-Latency Triggered TWT," IEEE 802.11-20/1843r2, 14 pages, Dec. 2020.

(Continued)

*Primary Examiner* — Pao Sinkantarakorn
*Assistant Examiner* — Pawaris Sinkantarakom
(74) *Attorney, Agent, or Firm* — BRYAN CAVE LEIGHTON PAISNER LLP

(57) ABSTRACT

A method and a device for signaling an ERSP in a wireless LAN system are presented. Specifically, a first reception STA receives a beacon frame from a transmission STA. The first reception STA receives a first frame from the transmission STA during an RSP. The beacon frame includes allocation information about the RSP. The first frame includes signaling information about the ERSP having an extended RSP. The first frame is transmitted when the ERSP starts. The signaling information about the ERSP includes information about whether an ERSP is present, information about the time when the ERSP ends, and information about the duration of the ERSP.

9 Claims, 25 Drawing Sheets

(56) References Cited

U.S. PATENT DOCUMENTS

| | | |
|---|---|---|
| 2017/0311258 A1 | 10/2017 | Asterjadhi et al. |
| 2018/0332534 A1 | 11/2018 | Hou et al. |
| 2019/0045438 A1* | 2/2019 | Cariou .............. H04W 52/0229 |
| 2019/0306794 A1* | 10/2019 | Ghosh ............... H04W 52/0219 |
| 2020/0137612 A1* | 4/2020 | Li ..................... H04W 28/0221 |
| 2023/0345537 A1* | 10/2023 | Guo ..................... H04W 74/08 |

OTHER PUBLICATIONS

Baek et al. "TGbe D0.3 Comment Resolutions for Restricted TWT SP," IEEE 802.11-21/0672r2, 4 pages, Apr. 2021.

* cited by examiner (a)

Figure 4:
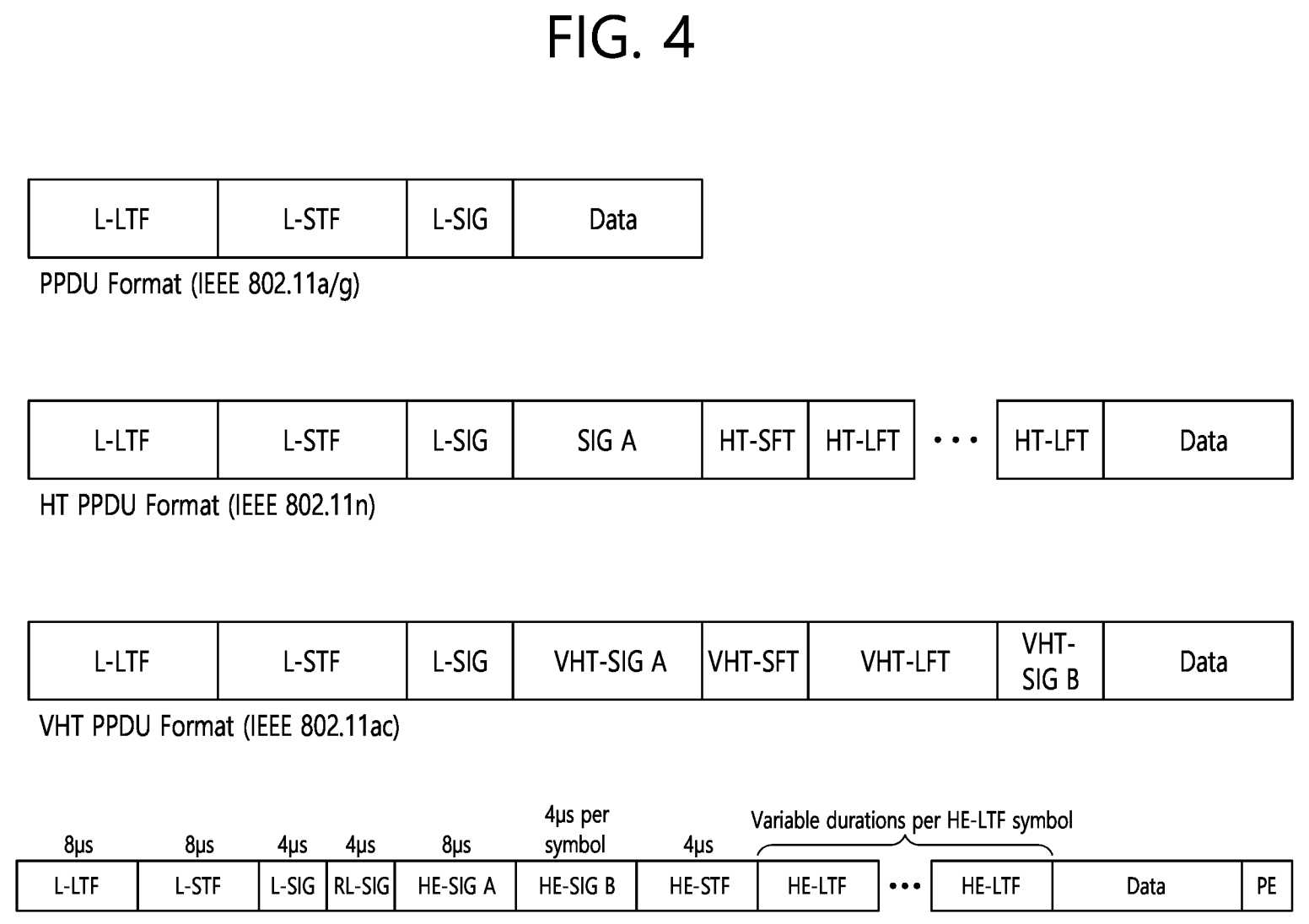

| L-LTF | L-STF | L-SIG | Data |
|---|---|---|---|

PPDU Format (IEEE 802.11a/g)

| L-LTF | L-STF | L-SIG | SIG A | HT-SFT | HT-LFT | ··· | HT-LFT | Data |
|---|---|---|---|---|---|---|---|---|

HT PPDU Format (IEEE 802.11n)

| L-LTF | L-STF | L-SIG | VHT-SIG A | VHT-SFT | VHT-LFT | VHT-SIG B | Data |
|---|---|---|---|---|---|---|---|

VHT PPDU Format (IEEE 802.11ac)

| L-LTF | L-STF | L-SIG | RL-SIG | HE-SIG A | HE-SIG B | HE-STF | HE-LTF | ··· | HE-LTF | Data | PE |
|---|---|---|---|---|---|---|---|---|---|---|---|
| 8µs | 8µs | 4µs | 4µs | 8µs | 4µs per symbol | 4µs | | | | | |

Variable durations per HE-LTF symbol

| User Identifier | RU Allocation | Coding Type | MCS |
|:---:|:---:|:---:|:---:|
| 12 | TBD | TBD | TBD |

Bits:

FIG. 10

| L-STF | L-LTF | L-SIG | RL-SIG | U-SIG | EHT-SIG | EHT-STF | EHT-LTF | Data |

FIG. 14

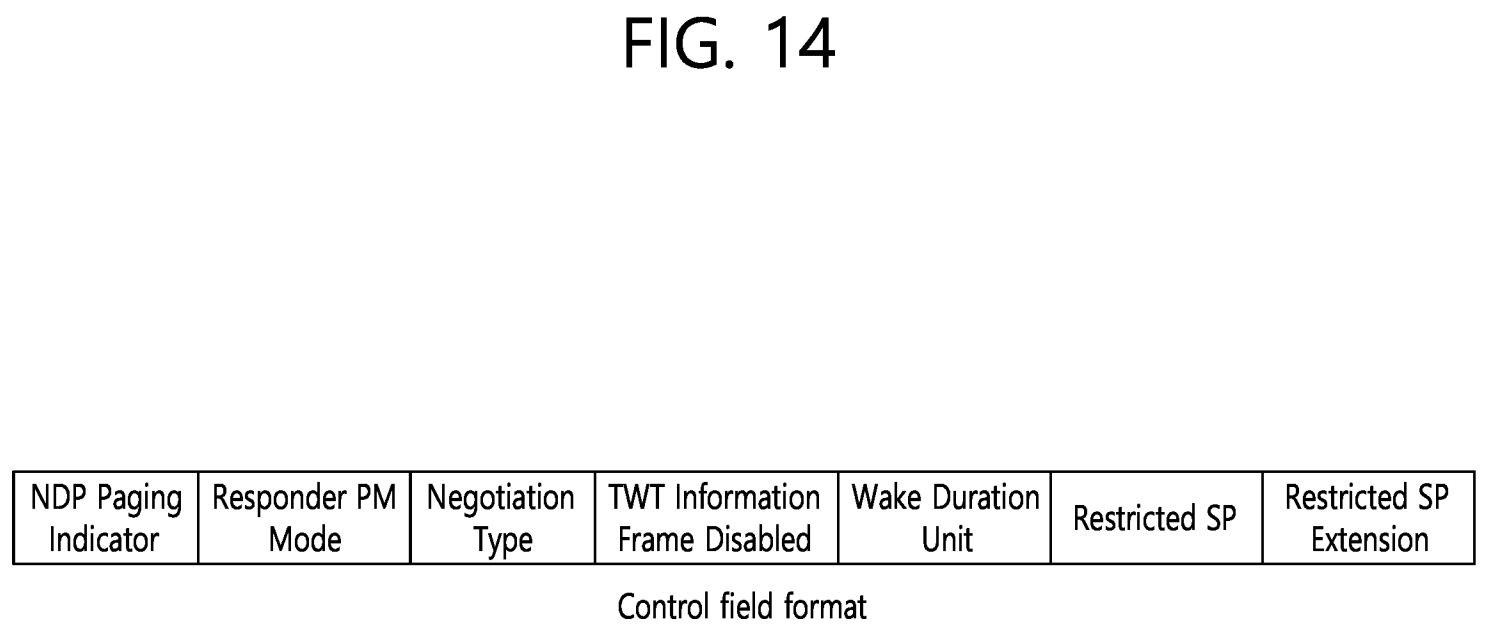

| NDP Paging Indicator | Responder PM Mode | Negotiation Type | TWT Information Frame Disabled | Wake Duration Unit | Restricted SP | Restricted SP Extension |
|---|---|---|---|---|---|---|

Control field format

FIG. 15

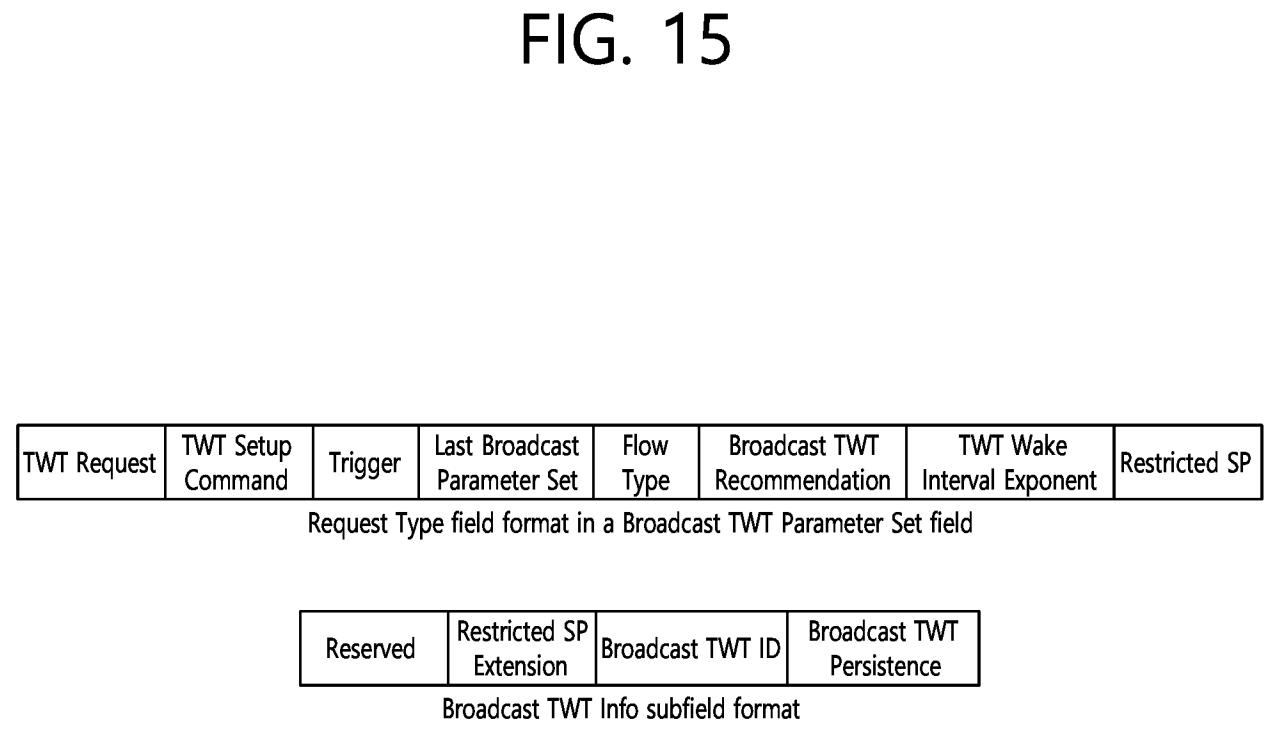

| TWT Request | TWT Setup Command | Trigger | Last Broadcast Parameter Set | Flow Type | Broadcast TWT Recommendation | TWT Wake Interval Exponent | Restricted SP |
|---|---|---|---|---|---|---|---|

Request Type field format in a Broadcast TWT Parameter Set field

| Reserved | Restricted SP Extension | Broadcast TWT ID | Broadcast TWT Persistence |
|---|---|---|---|

Broadcast TWT Info subfield format

FIG. 20

| B0                       | B2  | B3                    |  | B4                   |  | B5                       | B6 | B7      |  | B8      | Bn |
|--------------------------|-----|-----------------------|--|----------------------|--|--------------------------|----|---------|--|---------|----|
| TWT Flow Identifier      |     | Response Requested    |  | Next TWT Request     |  | Next TWT Subfield Size   |    | All TWT |  | Next TWT |    |

Bits:    3    1    1    2    1    0, 32, 48, or 64 receiving, by a first receiving STA (station), a beacon frame from a transmitting STA ~S2510 receiving, by the first receiving STA, a first frame from the transmitting STA during a Restricted Service Period (RSP) ~S2520

METHOD AND DEVICE FOR SIGNALING ERSP IN WIRELESS LAN SYSTEM

CROSS-REFERENCE TO RELATED APPLICATIONS

This application is the National Stage filing under 35 U.S.C. 371 of International Application No. PCT/KR2022/000805, filed on Jan. 17, 2022, which claims the benefit of KR Patent Application No. 10-2021-0007533 filed on Jan. 19, 2021 and KR Patent Application No. 10-2021-0009994 filed on Jan. 25, 2021, the contents of which are all hereby incorporated by reference herein in their entirety.

TECHNICAL FIELD

The present specification is to satisfy the requirements of low-latency traffic in a WLAN system, and more particularly, relates to a method and apparatus for signaling for ERSP.

BACKGROUND

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

In a new WLAN standard, an increased number of spatial streams may be used. In this case, in order to properly use the increased number of spatial streams, a signaling technique in the WLAN system may need to be improved.

SUMMARY

The present specification proposes a method and apparatus for signaling for ERSP in a WLAN system.

An example of this specification proposes a method for signaling for ERSP.

The present embodiment may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

This embodiment proposes a method and apparatus for extending a Restricted Service Period (RSP) proposed for low latency traffic. Since the requirement of low-latency traffic may not be satisfied within the RSP due to legacy STAs that do not support RSP, Overlapping Basic Service Set (OBSS) STAs, or channel conditions, etc., an extension or expansion of the RSP is required. Here, the transmitting STA may correspond to an Access Point Station (AP STA), and the receiving STA may correspond to a non-AP STA.

A first receiving station (STA) receives a beacon frame from a transmitting STA.

The first receiving STA receives a first frame from the transmitting STA during a Restricted Service Period (RSP). The beacon frame includes allocation information on the RSP.

The first frame includes signaling information on an Extended RSP (ERSP) to which the RSP is extended. The first frame is transmitted when the ERSP starts.

The signaling information on the ERSP includes information on whether the ERSP is present, information on a time point at which the ERSP ends, or information on the duration of the ERSP.

The first frame is a previously defined frame, and this embodiment proposes a method for signaling the ERSP by transmitting a previously defined frame (trigger frame, TWT information frame, QoS null frame or QoS data frame described later) at the time when the ERSP starts.

According to the embodiment proposed in this specification, a STA that supports RSP (or rTWT (restricted TWT)) may not satisfy the requirements of low-latency traffic within the allocated RSP due to legacy STAs, OBSS STAs, or channel conditions that do not support RSP, so an effect of sufficiently satisfying the requirements for low-latency traffic may occur through extension of the allocated RSP.

BRIEF DESCRIPTION OF THE DRAWINGS

FIG. 4 illustrates an example of a PPDU used in an IEEE standard.

FIG. 10 illustrates an example of a PPDU used in the present specification.

FIG. 14 shows a format of a Control field of a TWT element including information on RSP signaling.

FIG. 15 illustrates formats of a Request type subfield and a Broadcast TWT Info subfield of a Broadcast TWT Parameter Set field including information on RSP signaling.

FIG. 20 shows an example of a TWT Information frame format.

DETAILED DESCRIPTION

Figure 1:
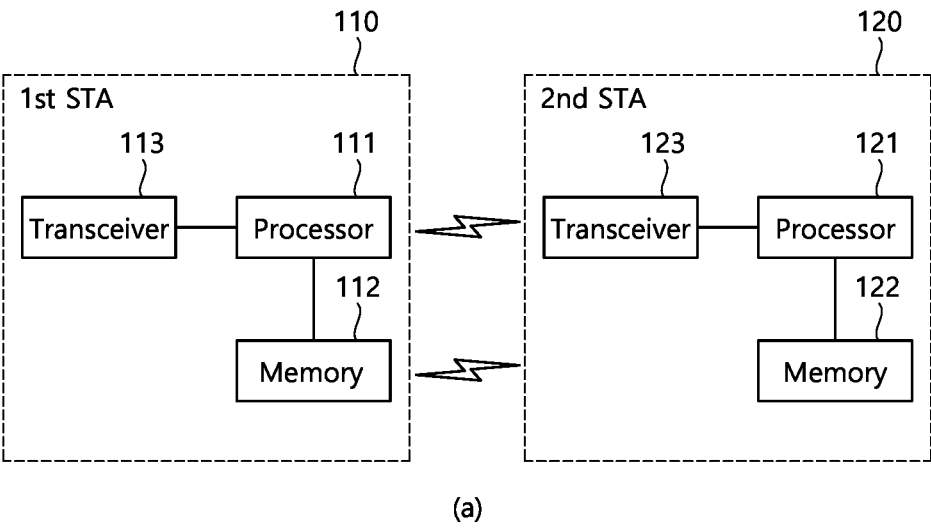
FIG. 1 shows an example of a transmitting apparatus and/or receiving apparatus of the present specification.
Figure 1:
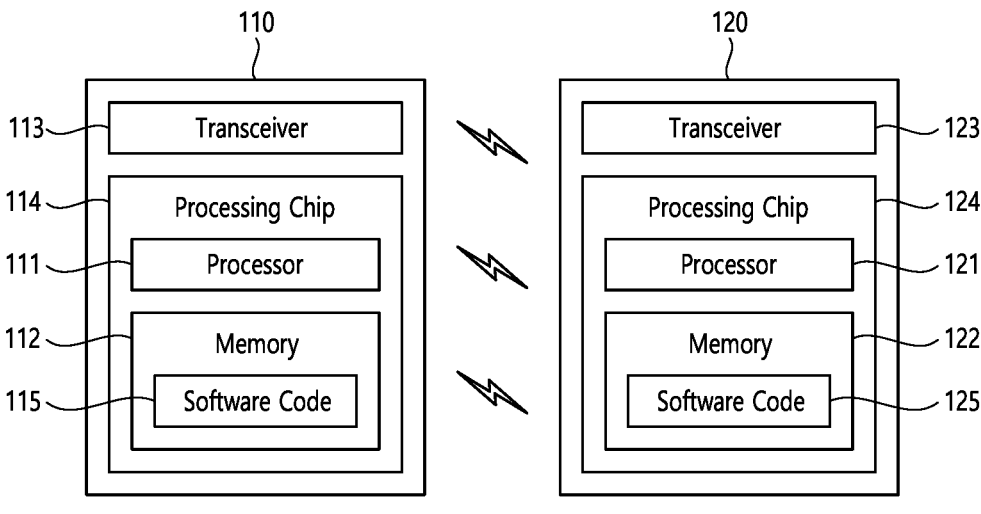

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3$^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
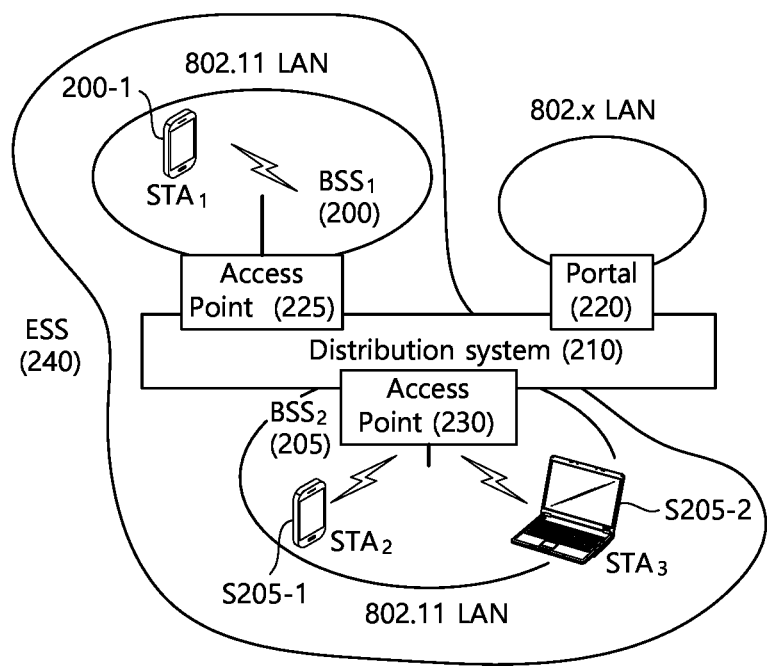
FIG. 2 is a conceptual view illustrating the structure of a wireless local area network (WLAN).
Figure 2:
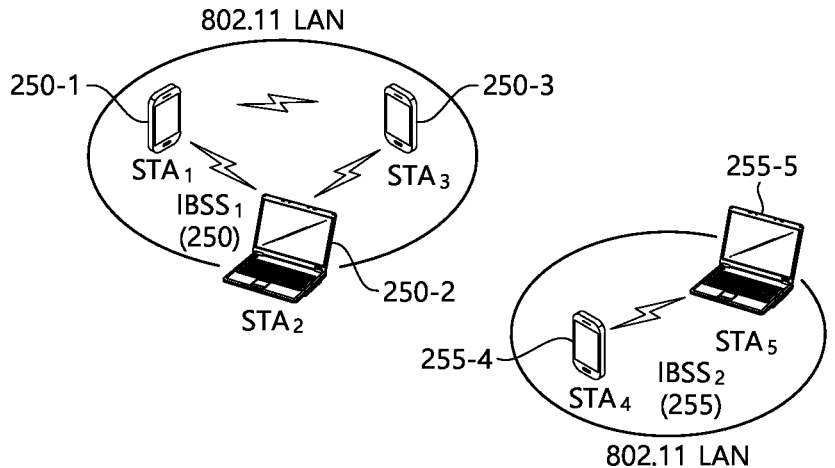

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (S SID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
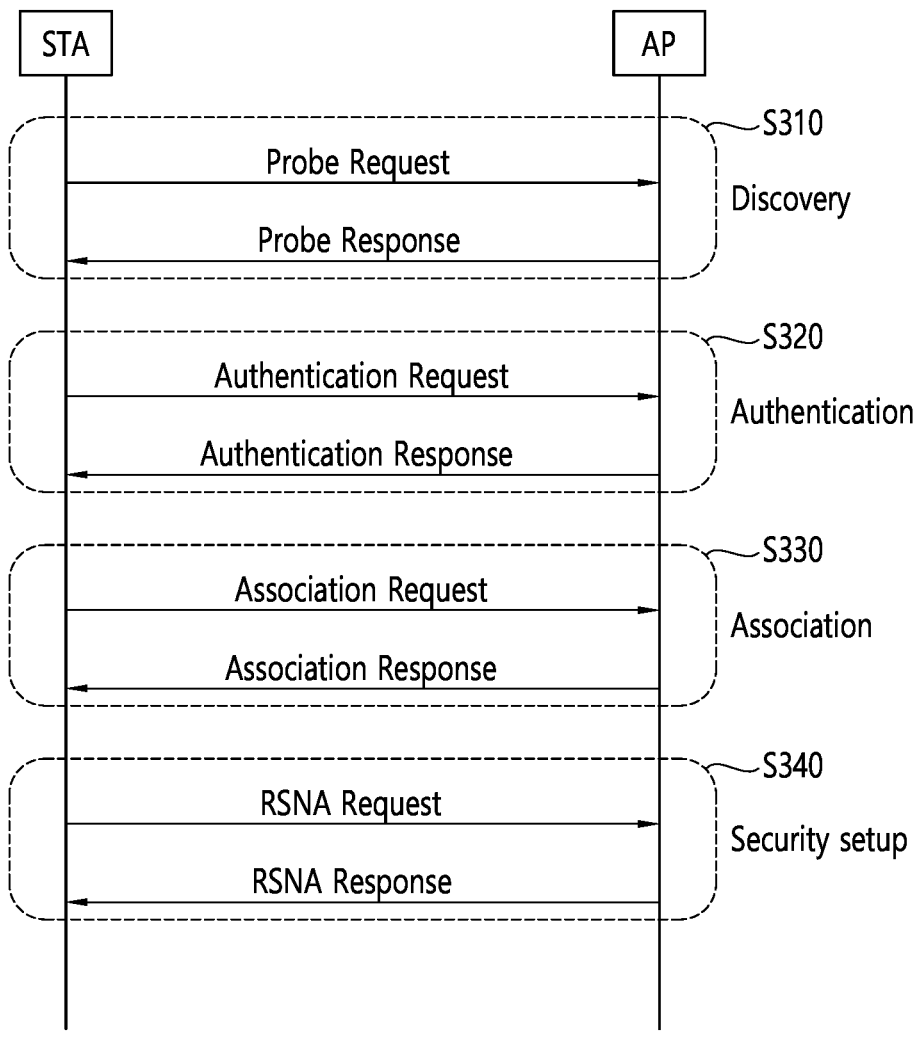
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Figure 5:
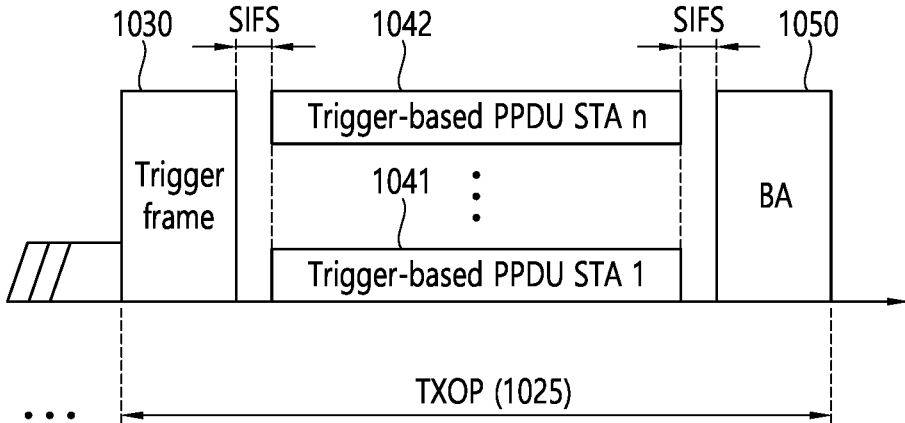
FIG. 5 illustrates an operation based on UL-MU.

FIG. 5 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 6 to FIG. 8. Even if UL-MU communication is used, an orthogonal frequency division multiple access (OFDMA) scheme or a MU MIMO scheme may be used, and the OFDMA and MU-MIMO schemes may be simultaneously used.

Figure 6:
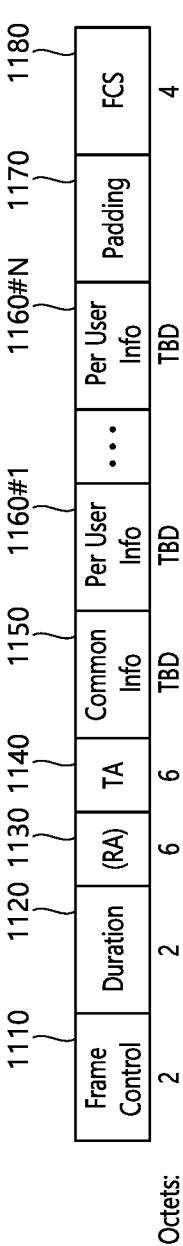
FIG. 6 illustrates an example of a trigger frame.

FIG. 6 illustrates an example of a trigger frame. The trigger frame of FIG. 6 allocates a resource for uplink multiple-user (MU) transmission, and may be transmitted, for example, from an AP. The trigger frame may be configured of a MAC frame, and may be included in a PPDU.

Each field shown in FIG. 6 may be partially omitted, and another field may be added. In addition, a length of each field may be changed to be different from that shown in the figure.

A frame control field 1110 of FIG. 6 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 6 are preferably included. The per user information field may also be called an "allocation field".

In addition, the trigger frame of FIG. 6 may include a padding field 1170 and a frame check sequence field 1180.

Each of the per user information fields 1160 #1 to 1160 #N shown in FIG. 6 may include a plurality of subfields.

Figure 7:
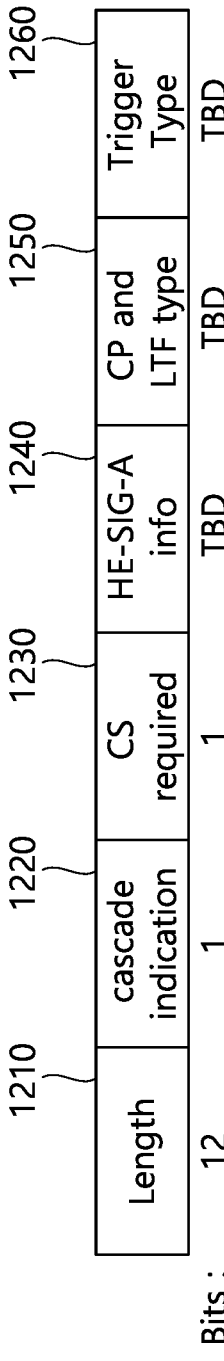
FIG. 7 illustrates an example of a common information field of a trigger frame.

FIG. 7 illustrates an example of a common information field of a trigger frame. A subfield of FIG. 7 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 8:
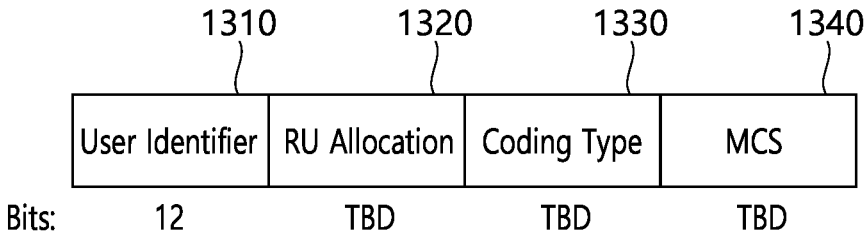
FIG. 8 illustrates an example of a subfield included in a per user information field.

FIG. 8 illustrates an example of a subfield included in a per user information field. A user information field 1300 of FIG. 8 may be understood as any one of the per user information fields 1160 #1 to 1160 #N mentioned above with reference to FIG. 6. A subfield included in the user information field 1300 of FIG. 8 may be partially omitted, and an extra subfield may be added. In addition, a length of each subfield illustrated may be changed.

A user identifier field 1310 of FIG. 8 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320.

The subfield of FIG. 8 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 8 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 9:
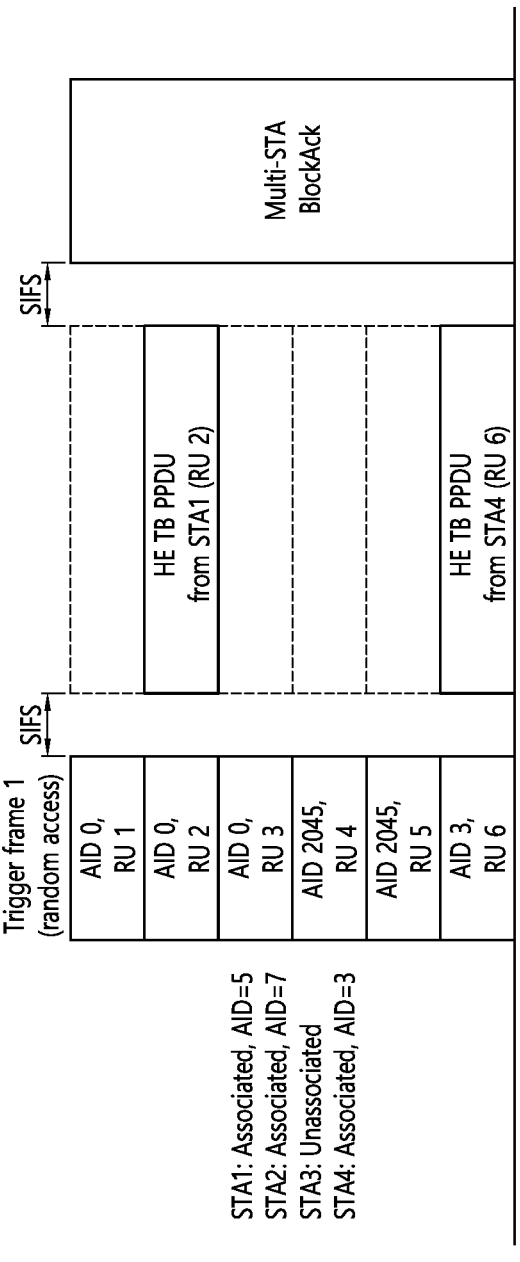
FIG. 9 describes a technical feature of the UORA scheme.

FIG. 9 describes a technical feature of the UORA scheme.

A transmitting STA (e.g., an AP) may allocate six RU resources through a trigger frame as shown in FIG. 9. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 8. Information related to the RU 1 to RU 6 may be included, for example, in the RU allocation field 1320 of FIG. 8. AID=0 may imply a UORA resource for an associated STA, and AID=2045 may imply a UORA resource for an un-associated STA. Accordingly, the 1st to 3rd RU resources of FIG. 9 may be used as a UORA resource for the associated STA, the 4th and 5th RU resources of FIG. 9 may be used as a UORA resource for the un-associated STA, and the 6th RU resource of FIG. 9 may be used as a typical resource for UL MU.

In the example of FIG. 9, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 9, since an AID (e.g., AID=3) of the STA4 is included in a trigger frame, a resource of the RU 6 is allocated without backoff.

Specifically, since the STA1 of FIG. 9 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 9 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 9 is an un-associated STA, the total number of eligible RA RUs for the STA3 is 2 (RU 4, RU 5), and thus the STA3 decreases the OBO counter by 2 but the OBO counter is greater than 0.

Hereinafter, a PPDU transmitted/received in a STA of the present specification will be described.

Figure 10:
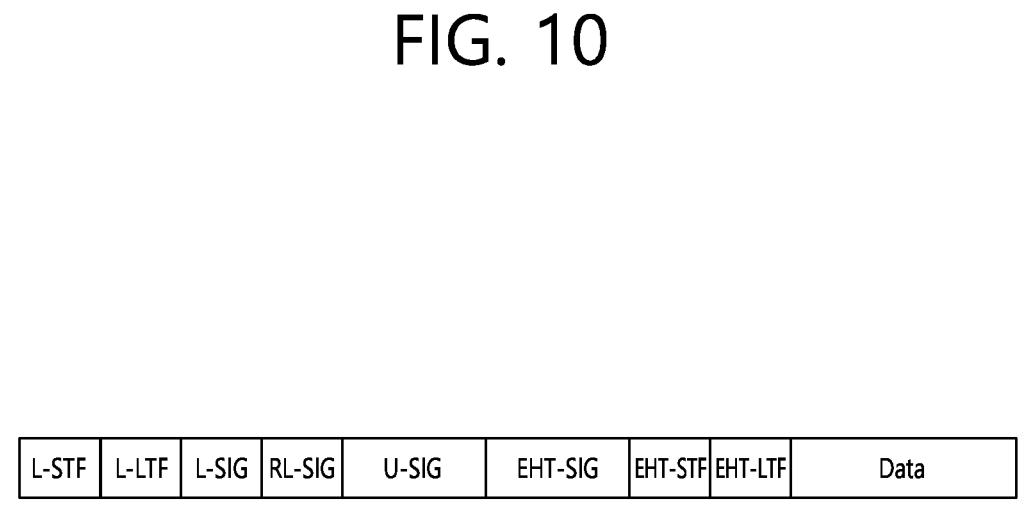

FIG. 10 illustrates an example of a PPDU used in the present specification.

The PPDU of FIG. 10 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 10 may indicate the entirety or part of a PPDU type used in the EHT system. For example, the example of FIG. 10 may be used for both of a single-user (SU) mode and a multi-user (MU) mode. In other words, the PPDU of FIG. 10 may be a PPDU for one receiving STA or a plurality of receiving STAs. When the PPDU of FIG. 10 is used for a trigger-based (TB) mode, the EHT-SIG of FIG. 10 may be omitted. In other words, an STA which has received a trigger frame for uplink-MU (UL-MU) may transmit the PPDU in which the EHT-SIG is omitted in the example of FIG. 10.

In FIG. 10, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 10 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 10, the L-LTE and the L-STF may be the same as those in the conventional fields.

The L-SIG field of FIG. 10 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a ½ coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier{subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index{−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 10. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 μs. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=½ to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 10. The PPDU of FIG. 10 may be used to transmit/receive frames of various types. For example, the PPDU of FIG. 10 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 10 may be used for a management frame. An example of the management frame may include a beacon frame, a (re-)association request frame, a (re-)association response frame, a probe request frame, and a probe response frame. For example, the PPDU of FIG. 10 may be used for a data frame. For example, the PPDU of FIG. 10 may be used to simultaneously transmit at least two or more of the control frames, the management frame, and the data frame.

Figure 11:
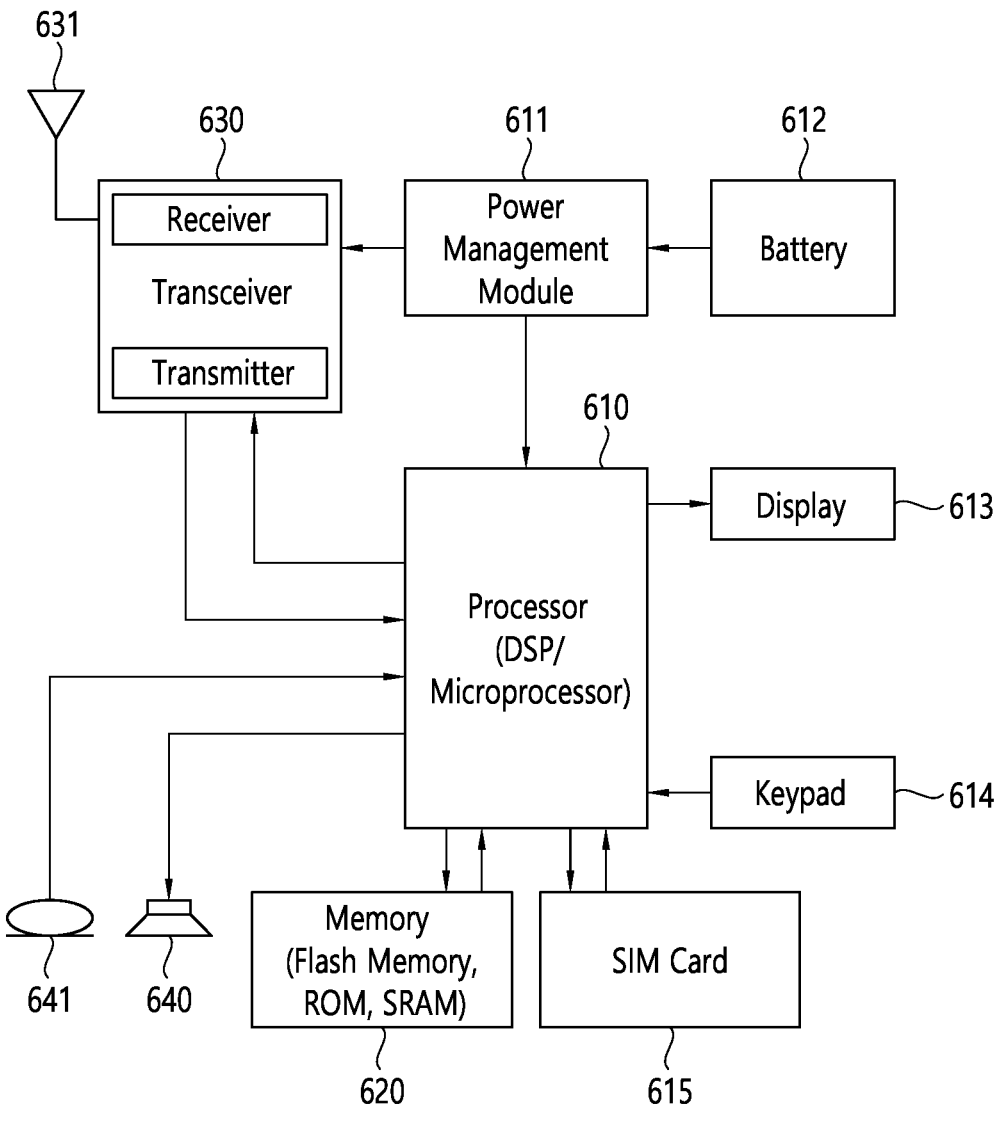
FIG. 11 illustrates an example of a modified transmission device and/or receiving device of the present specification.

FIG. 11 illustrates an example of a modified transmission device and/or receiving device of the present specification.

Each device/STA of the sub-figure (a)/(b) of FIG. 1 may be modified as shown in FIG. 11. A transceiver 630 of FIG.

11 may be identical to the transceivers 113 and 123 of FIG. 1. The transceiver 630 of FIG. 11 may include a receiver and a transmitter.

A processor 610 of FIG. 11 may be identical to the processors 111 and 121 of FIG. 1. Alternatively, the processor 610 of FIG. 11 may be identical to the processing chips 114 and 124 of FIG. 1.

A memory 620 of FIG. 11 may be identical to the memories 112 and 122 of FIG. 1. Alternatively, the memory 620 of FIG. 11 may be a separate external memory different from the memories 112 and 122 of FIG. 1.

Referring to FIG. 11, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 11, a speaker 640 may output a result related to a sound processed by the processor 610. A microphone 641 may receive an input related to a sound to be used by the processor 610.

1. Definition and Purpose of Restricted Service Period (RSP) and Extended RSP (ERSP)

In EHT (802.11be), a restricted service period (RSP) is proposed based on the existing Target Wake Time (TWT) concept for Low Latency (LL) traffic. First, in the present specification, an STA that recognizes (or supports) RSP is referred to as an RSP STA, and an STA that does not recognize (or does not support) RSP is referred to as a Non-RSP (NRSP) STA.

Figure 12:
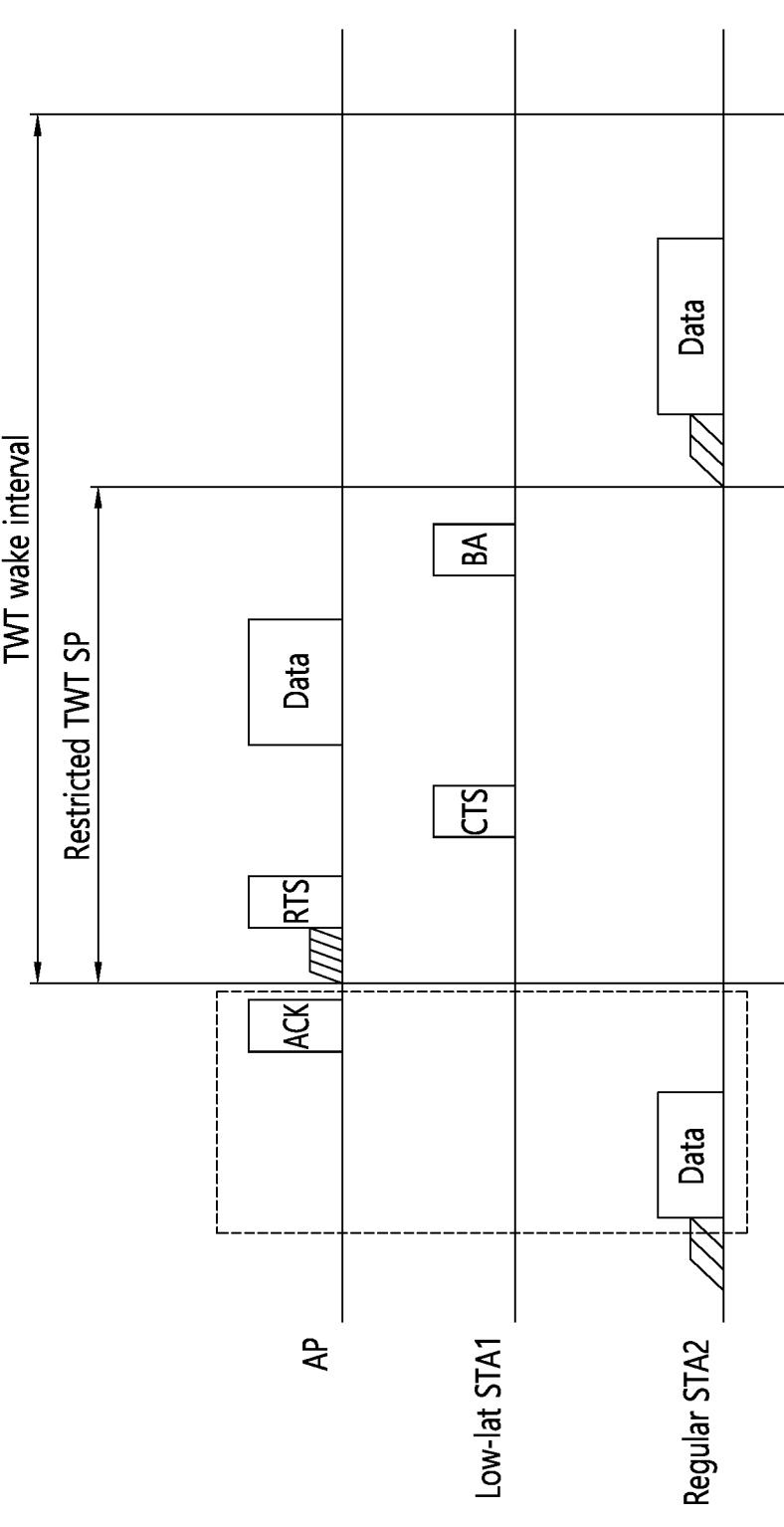
FIG. 12 shows RSP based on TWT.

FIG. 12 shows RSP based on TWT.

Figure 13:
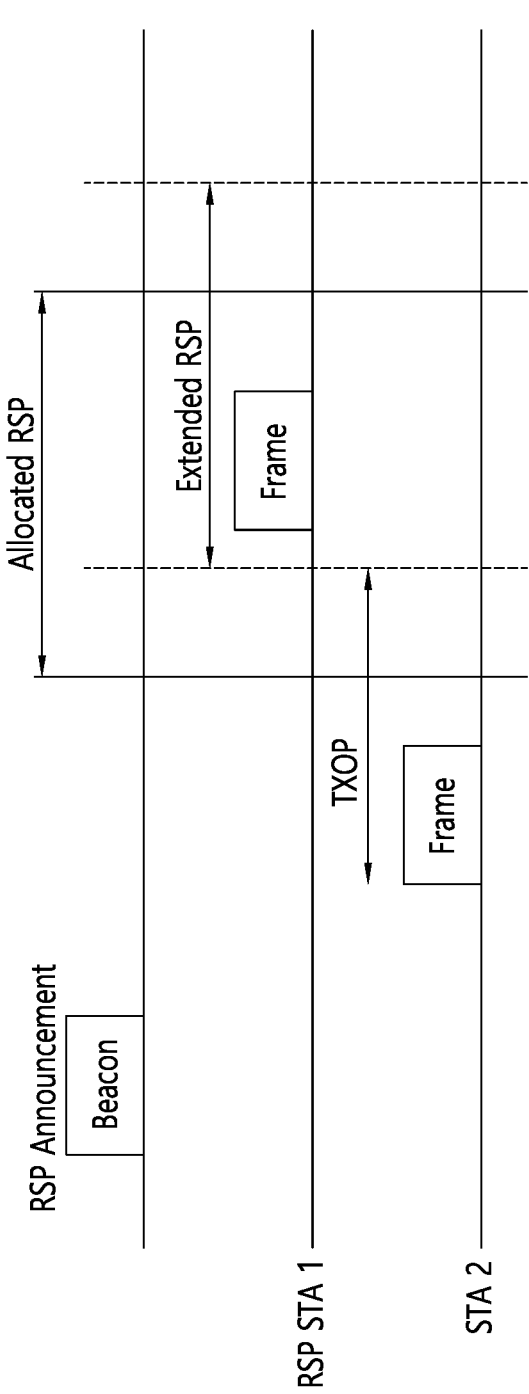
FIG. 13 shows an ERSP whose start time and end time are delayed from the previously allocated RSP.

Basically, the RSP is allocated for STAs with LL traffic, and the NRSP STA (e.g., Regular STA 2) must terminate its TXOP before the Restricted SP starts. However, an RSP STA or NRSP STA transmitting traffic having a priority higher than LL traffic may continue to perform TXOP even if the start point of the Restricted TWT SP passes. At this time, since the previously allocated RSP decreases, the Restricted SP may be extended as shown in FIG. 13. That is, the start time and end time of ERSP (Extended RSP) may be delayed from the previously allocated RSP.

FIG. 13 shows an ERSP whose start time and end time are delayed from the previously allocated RSP.

Referring to FIG. 13, STA 2 must secure TXOP even after the previously allocated RSP starts to transmit frames. As a result, an ERSP in which a start time and an end time are delayed in the previously allocated RSP is set, and RSP STA 1 can receive a frame from the AP during the ERSP.

Therefore, this specification proposes a signaling method for whether the TWT SP is an RSP and whether the RSP can be extended.

On the other hand, RSP STA 1 does not know whether STA 2 is an RSP STA or an NRSP STA, and RSP STA 1 does not know whether the TXOP of STA 2 started at the assigned RSP or before.

In addition, if RSP STA 1 does not know the ERSP, if the previously allocated RSP is over, it may enter a doze state and may not be able to transmit sufficient LL traffic. Accordingly, RSP STAs need to know information on the ERSP (e.g., how much the RSP has been extended, and the changed start and end times of the ERSP). Therefore, the present specification additionally proposes a signaling method for ERSP.

References (names) in this specification may be changed, and STAs may include AP STAs or non-AP STAs.

2. General Signaling for RSP

Basically, the TWT element can signal 1) whether the TWT SP is an RSP and 2) whether or not the RSP can be extended. As an example of 2), in order to eliminate the impact on the entire TWT SP Schedule including RSP, there may be times when RSP is not extended even if there is an ongoing frame exchange before starting RSP, and when there is an ongoing frame exchange to guarantee SP for RSP, RSP may be extended at times.

1) Signaling of whether allocated SP is RSP (1 bit): It may vary depending on whether it is applied to existing TWT types, Individual TWT and Broadcast TWT.

1-1) If RSP is applied only to Broadcast TWT, basically, whether a TWT SP is an RSP can be signaled by using a reserved bit of a Request type subfield of a Broadcast TWT Parameter Set field having currently reserved bits or a reserved bit of a Broadcast TWT Info subfield. Through this, it is possible to distinguish whether it is for RSP per one broadcast TWT ID or not.

1-2) If both individual TWT and broadcast TWT are applied, it is possible to signal whether the TWT SP is an RSP by using the reserved bit of the control field of the TWT element.

2) Signaling of whether allocated RSP is extended (1 bit): Signaling can be performed at the same locations as in 1).

2-1) If RSP is applied only to Broadcast TWT, basically, whether or not the RSP is extended can be signaled by using a reserved bit of a Request type subfield of a Broadcast TWT Parameter Set field having currently reserved bits or a reserved bit of a Broadcast TWT Info subfield. Through this, it is possible to distinguish whether or not the RSP is extended per one broadcast TWT ID.

2-2) If both individual TWT and broadcast TWT are applied, it is possible to signal whether the RSP is extended by using the reserved bit of the control field of the TWT element.

FIG. 14 shows a format of a Control field of a TWT element including information on RSP signaling.

FIG. 14 is an example of including a Restricted SP subfield for 1) and a Restricted SP Extension subfield for 2) using reserved bits of the control field of the TWT element to apply both Individual TWT and Broadcast TWT (1-2)+2-2)). However, if it is applied only to Broadcast TWT, it can be used in combination of 1-1) and 2-1), and one example is shown in FIG. 15. But it is not limited to this.

FIG. 15 illustrates formats of a Request type subfield and a Broadcast TWT Info subfield of a Broadcast TWT Parameter Set field including information on RSP signaling.

Referring to the upper part of FIG. 15, the Restricted SP subfield is configured using reserved bits of the Request type subfield of the Broadcast TWT Parameter Set field, and the AP may signal whether the TWT SP is an RSP through the Restricted SP subfield.

Referring to the lower part of FIG. 15, a Restricted SP Extension subfield may be configured using reserved bits of the Broadcast TWT Info subfield, and whether or not RSP is extended may be signaled through the Restricted SP Extension subfield. Examples according to the value of the Restricted SP Extension subfield are shown in FIGS. 16 and 17.

Figure 16:
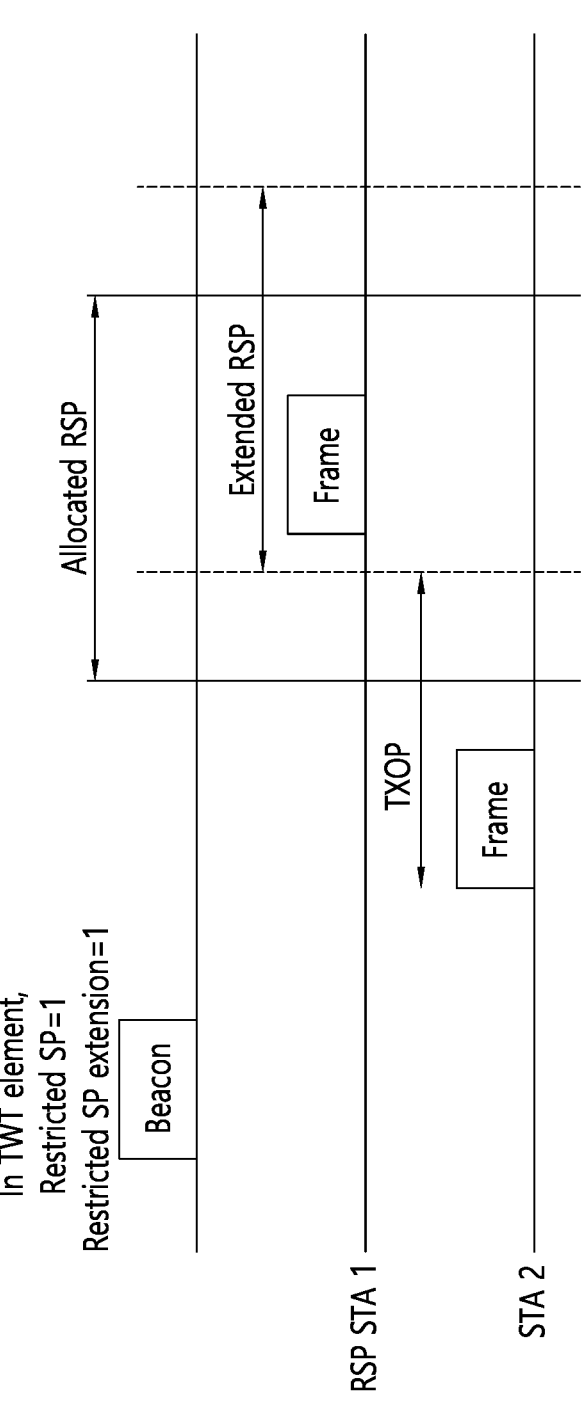
FIG. 16 shows an example of extending the RSP according to values of the Restricted SP subfield and the Restricted SP Extension subfield included in the TWT element.

FIG. 16 shows an example of extending the RSP according to values of the Restricted SP subfield and the Restricted SP Extension subfield included in the TWT element.

Referring to FIG. 16, since the value of the Restricted SP subfield in the TWT element included in the beacon is set to 1, the allocated SP corresponds to the RSP. In addition, since the value of the Restricted SP Extension subfield is set to 1, the allocated RSP is extended if there is an on-going frame exchange previously.

Figure 17:
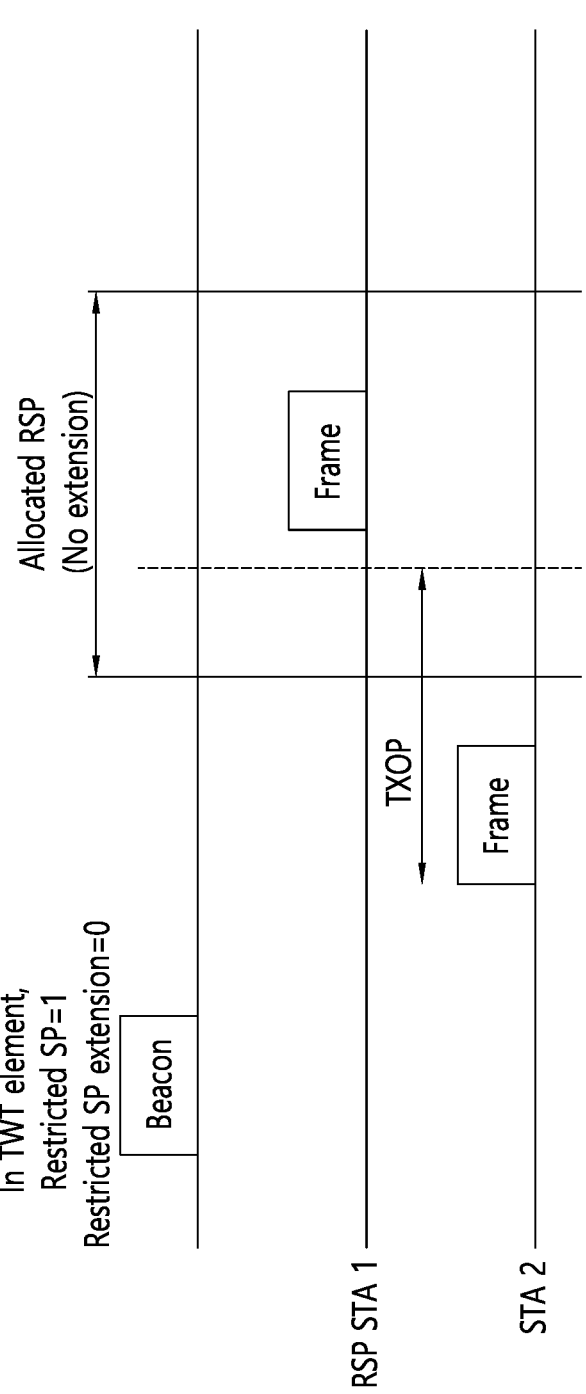
FIG. 17 shows an example of not extending the RSP according to values of the Restricted SP subfield and the Restricted SP Extension subfield included in the TWT element.

FIG. 17 shows an example of not extending the RSP according to values of the Restricted SP subfield and the Restricted SP Extension subfield included in the TWT element.

Referring to FIG. 17, since the value of the Restricted SP subfield in the TWT element included in the beacon is set to 1, the allocated SP corresponds to the RSP. However, since the value of the Restricted SP Extension subfield is set to 0, the allocated RSP is not extended even if there is an on-going frame exchange previously.

3. Signaling Method for ERSP

In section 2., signaling about whether basic RSP and ERSP are possible was proposed. This section proposes specific signaling to indicate ERSP.

Signaling for ERSP may be performed 1) before ERSP starts and 2) when ERSP starts.

1) Before ERSP Starts

Basically, signaling before ERSP starts must be performed during on-going frame exchange (e.g., during TXOP of STA 2 in FIG. 17). Therefore, ERSP may be indicated as shown in FIGS. 18 and 19 in the control field (e.g., A-control) of the frame during the corresponding TXOP.

Figure 18:
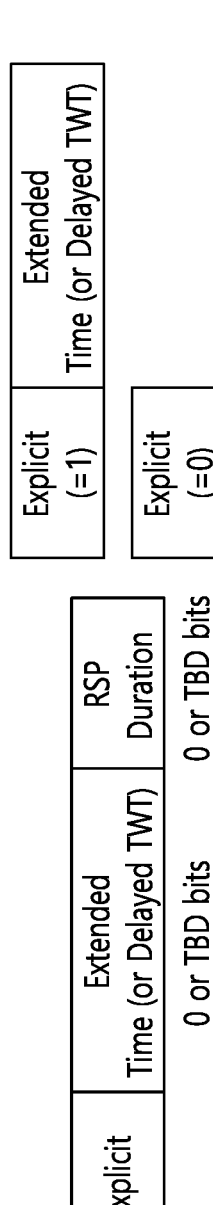
FIG. 18 shows a format of a control field for ERSP.
Figure 19:
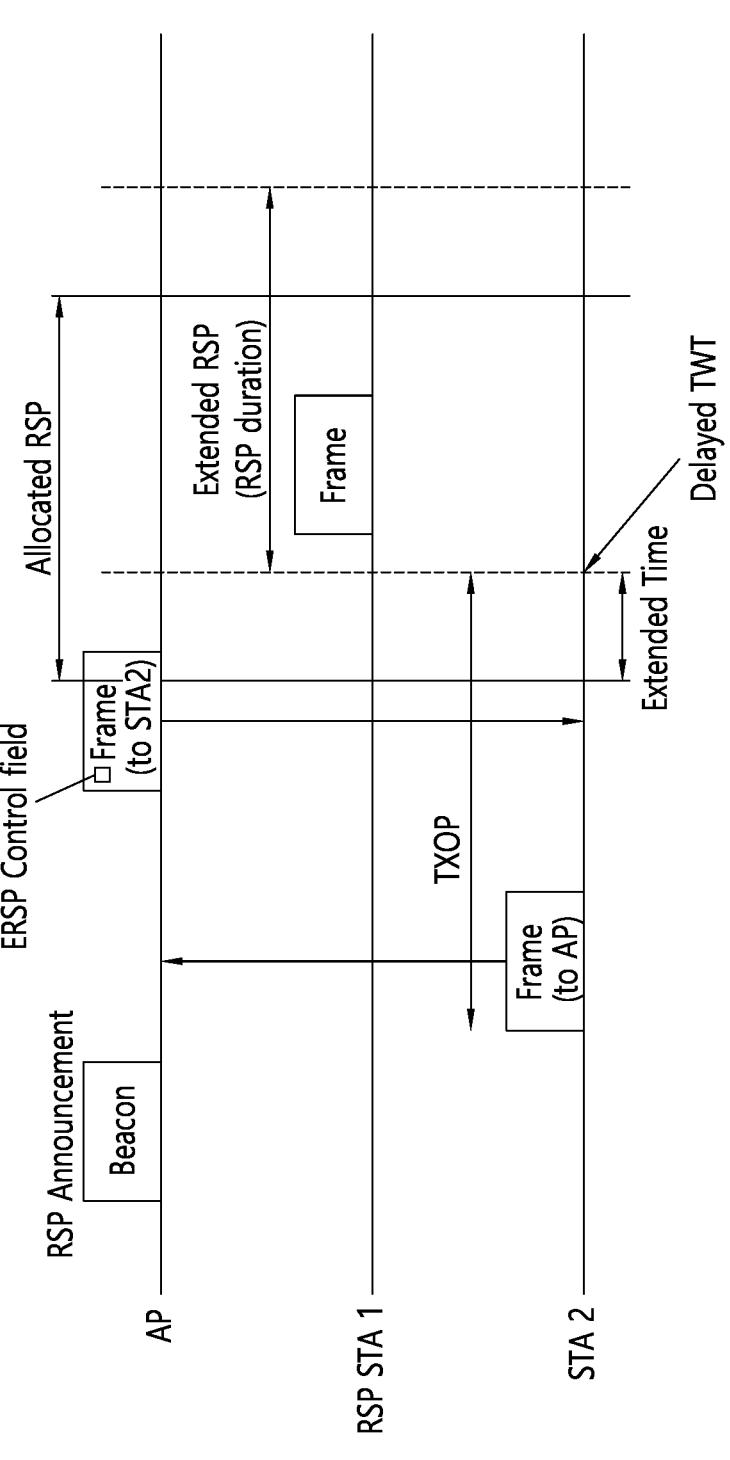
FIG. 19 shows an example of indicating an ERSP using a control field for the ERSP.

FIG. 18 shows a format of a control field for ERSP.

Referring to FIG. 18, the control field for ERSP may include one or more of an Explicit field, an Extended Time (or Delayed TWT) field, and an RSP Duration field.

Explicit field: Indicates whether explicit signaling is performed for extended RSP. If this value is 0, it is not explicitly indicated, and the start time of extended RSP is estimated through estimation of the remaining TXOP using the duration of the frame including this field (Extended Time (or Delayed TWT) field and RSP Duration field can be omitted). If the value of the Explicit field is 1, the extended RSP is explicitly indicated, so the Extended Time (or Delayed TWT) field and the RSP Duration field are included in the control field for ERSP. But, if the duration for ERSP is always the same as the previously announced RSP duration, a separate Duration field may not be included.

Extended Time or Delayed TWT field: Extended time means the time RSP is delayed due to on-going frame exchange, and the start point of ERSP can be calculated based on the current time. Delayed TWT means the starting point of ERSP. Therefore, both methods using the two fields can know the starting point of ERSP. However, because TWT is based on TSF (Timing Synchronization Function), extended time can be better (than delayed TWT) in terms of overhead, since TWT is indicated with a size of 2 octets even in the existing broadcast TWT.

RSP Duration field: As mentioned in the Explicit field, if the duration of the ERSP is always the same as the duration of the previously announced RSP, the RSP Duration field is unnecessary. If duration adjustment for ERSP is required according to the current BSS situation, an RSP Duration field may be additionally included.

FIG. 19 shows an example of indicating an ERSP using a control field for the ERSP.

Referring to FIG. 19, the AP transmits a control field (ERSP Control field) for ERSP to STA 2 during STA 2's TXOP. When the Explicit field included in the ERSP Control field is set to 1, an Extended Time (or Delayed TWT) field and an RSP Duration field may be included together in the ERSP Control field. The Extended Time (or Delayed TWT) field may indicate an extended time of the RSP or a start point of the ERSP, and the RSP Duration field may indicate the duration of the ERSP.

However, this embodiment has a limitation that RSP STA 1 must read the ERSP Control field transmitted to STA 2. Basically, the ERSP control field included in the frame during on-going frame exchange is meaningful only when the 3rd party RSP STA (e.g., RSP STA 1 in FIG. 19) decodes it. Therefore, the 3rd party RSP STA has a weakness that there is a strong requirement to check the control field even though it is not a frame coming to itself.

2) When ERSP Starts

Basically, when ERSP starts, existing frames can be used.

2-1) Utilization of TWT Information Frame

FIG. 20 shows an example of a TWT Information frame format.

The TWT Information frame is used to suspend or resume the TWT SP allocated for a certain period in Individual TWT or Broadcast TWT. Therefore, it basically has the same structure as the TWT Information field of FIG. 20, and a field that can indicate a TWT called Next TWT exists in the TWT Information field. In particular, All TWT is added to the TWT Information field in the 802.11ax wireless LAN system.

In the TWT Information field of FIG. 20, a field that can be separately indicated for RSP is not separately defined, but when All TWT=1, it can be indicated using the fact that the TWT flow identifier value is reserved. Therefore, when All TWT=1, the ERSP may be indicated through a specific TWT Flow Identifier value (1 to 7), and the end point of the ERSP may be informed through the Next TWT value. On the other hand, if the RSP is based on broadcast TWT and RSPs are allocated to several STAs, this TWT Information frame must be transmitted over the air by setting the RA as a broadcast address.

Figure 21:
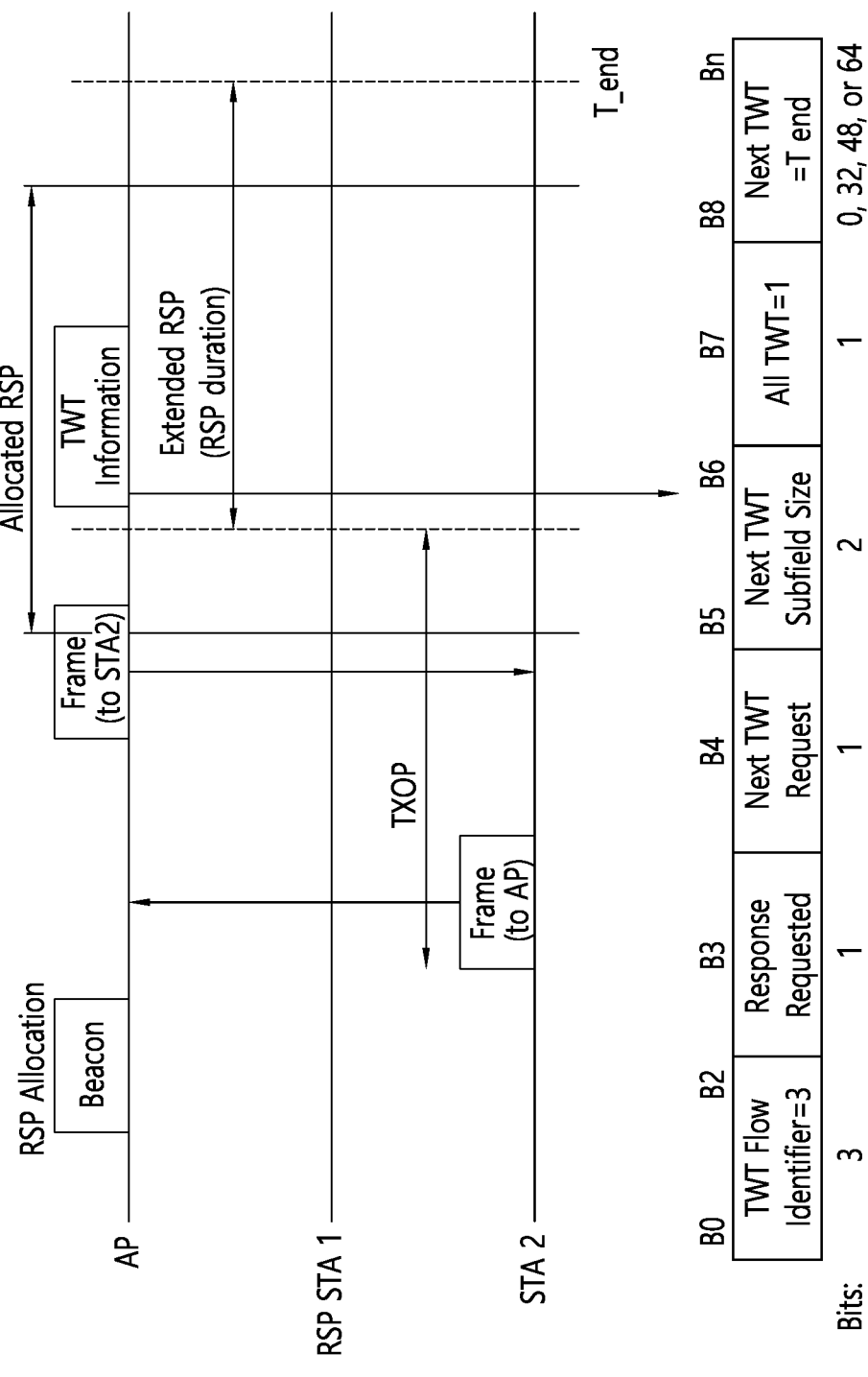
FIG. 21 shows an example of signaling for ERSP through a TWT Information frame.

FIG. 21 shows an example of signaling for ERSP through a TWT Information frame.

Referring to FIG. 21, the AP broadcasts TWT Information fame during the allocated RSP through a beacon frame. If the value of All_TWT of the TWT Information fame is 1 and the value of the TWT Flow Identifier is 3, since the allocated RSP means ERSP, the AP extends the current RSP through the All_TWT and the value of the TWT Flow Identifier may inform RSP STA 1. In addition, the end time of ERSP may be indicated through the T_end value of Next TWT.

2-2) Trigger Frame Utilization

In 802.11ax, Trigger-enabled TWT SP is proposed. In this SP, the scheduling STA (i.e., AP) must schedule at least one trigger frame. Therefore, when RSP is applied as a trigger-enabled TWT SP, the AP is likely to transmit a trigger frame first in RSP. Accordingly, the AP may include information on signaling for the ERSP in the trigger frame. However, since there is not enough signaling space in the Common Info field or User Info field of the current trigger frame, this section proposes a method of indicating information about ERSP through the User Info field using a specific AID value. Here, the trigger frame may be transmitted in a broadcast method.

Figure 22:
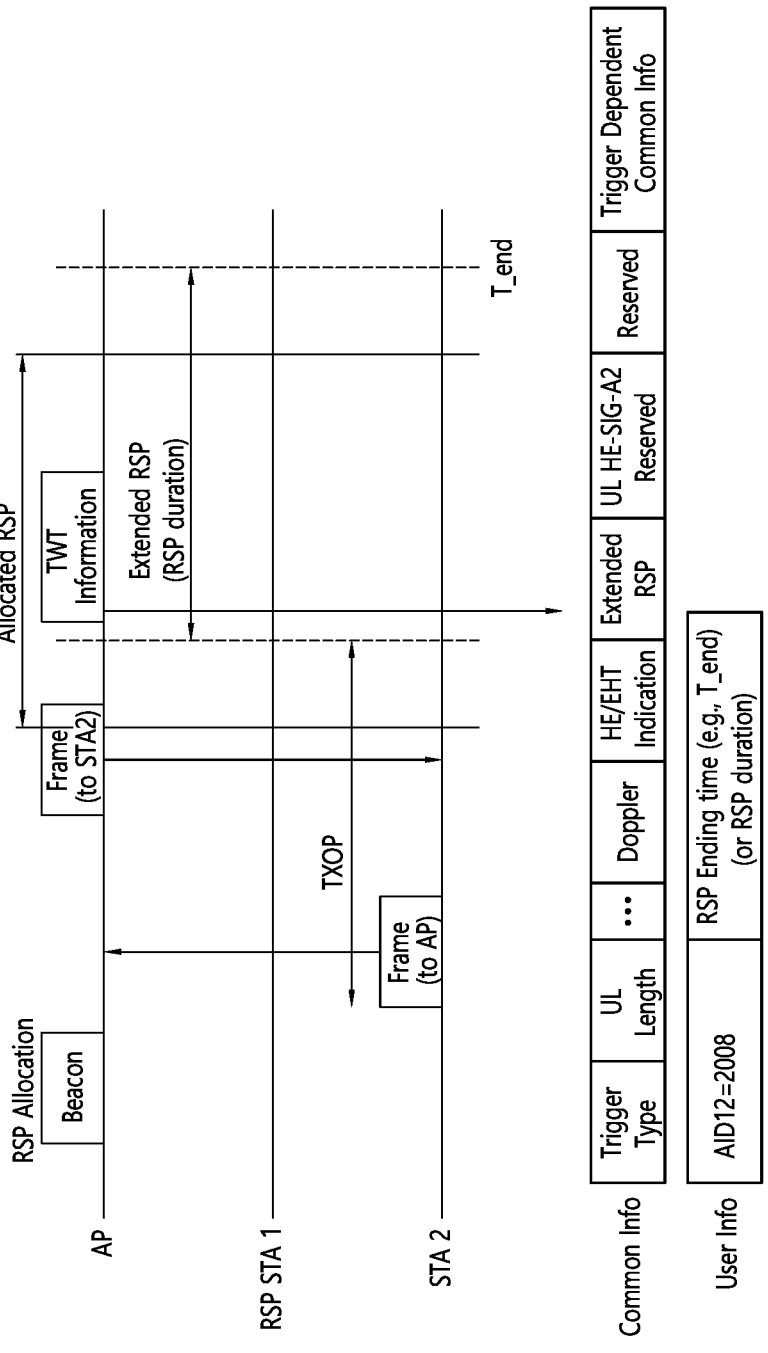
FIG. 22 shows an example of signaling for ERSP through a trigger frame.

FIG. 22 shows an example of signaling for ERSP through a trigger frame.

First, referring to the lower part of FIG. 22, the Common Info field and User Info field of the Trigger frame are defined as follows and may be used for signaling for ERSP.

Common Info field: First, the presence of ERSP information is notified using a UL HE-SIG-A2 reserved field (B54 to B62) or a reserved field (B63). Therefore, RSP STAs can decode a specific AID indicating ERSP information through the field.

User Info field: User Info field that uses a specific AID value (e.g., currently not used 2008, 2009, 2047, etc.) indicating ERSP information may include ERSP information such as RSP ending time or RSP duration. An RSP STA that has decoded a specific AID may recognize that the RSP has been extended through the RSP Ending time (or RSP duration) field of FIG. 22.

The upper part of FIG. 22 shows an example of ERSP signaling through a trigger frame. In the Common Info field, 1 bit of the UL HE-SIG-A2 Reserved field is used to configure the Extended RSP field, The Extended RSP field informs that there will be signaling for ERSP using a specific AID (e.g., 2008) in the User Info field. (For reference, in the current 802.11be, the HE/EHT indication is used as one of the UL HE-SIG-A2 reserved bits.) If the value of the Extended RSP field is 1, the User Info field having a specific AID value (e.g., 2008) can signal T_end, which is the RSP ending time, or RSP duration.

2-3) Utilization of QoS Null/Data Frame

When transmitting a QoS Null frame or QoS Data frame, the AP may signal ERSP by including a Control field (e.g., A-Control). Upon receiving the QoS Null frame or QoS Data frame, the RSP STA can recognize that the RSP has been extended by decoding the control ID for the ERSP. Here, the QoS Null frame or QoS Data frame may be transmitted in a unicast manner.

Figure 23:
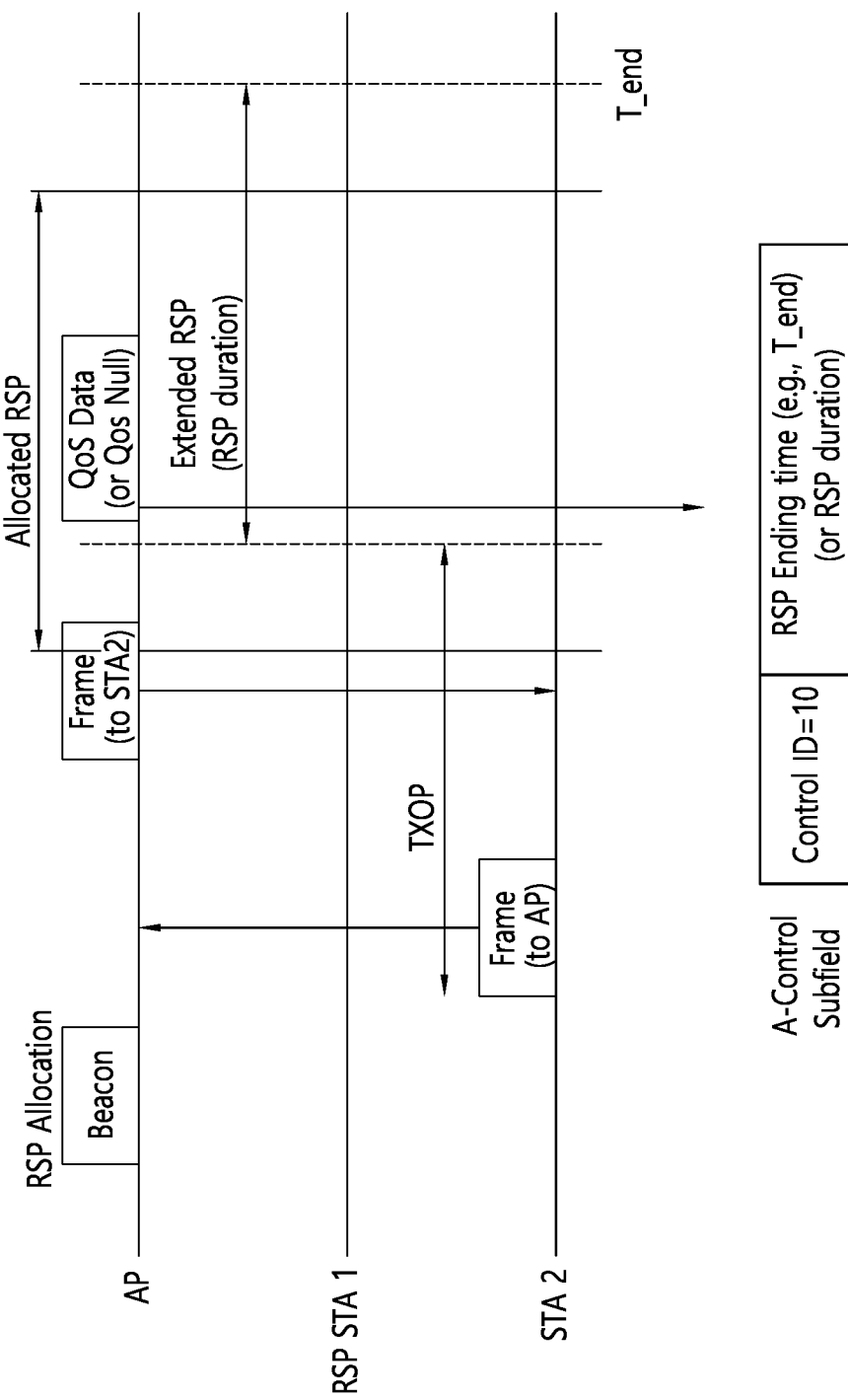
FIG. 23 shows an example of signaling for ERSP through an A-control field.

FIG. 23 shows an example of signaling for ERSP through an A-control field.

Referring to FIG. 23, if Control ID=10 indicates that signaling for ERSP exists, the RSP STA can recognize that the RSP has been extended through the Control ID. However, the value of Control ID may be changed. In the A-control field, in the next field according to the control ID, RSP ending time T_end or RSP duration can be signaled.

Hereinafter, the above-described embodiment will be described with reference to FIGS. 1 to 23.

Figure 24:
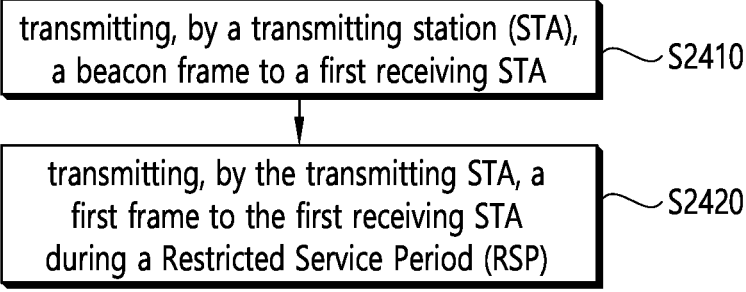
FIG. 24 is a flowchart illustrating a procedure in which an AP performs signaling for an ERSP according to this embodiment.

FIG. 24 is a flowchart illustrating a procedure in which an AP performs signaling for an ERSP according to this embodiment.

The example of FIG. 24 may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

This embodiment proposes a method and apparatus for extending a Restricted Service Period (RSP) proposed for low latency traffic. Since the requirement of low-latency traffic may not be satisfied within the RSP due to legacy STAs that do not support RSP, Overlapping Basic Service Set (OBSS) STAs, or channel conditions, etc., an extension or expansion of the RSP is required. Here, the transmitting STA may correspond to an Access Point Station (AP STA), and the receiving STA may correspond to a non-AP STA.

In step S2410, a transmitting STA (station) transmits a beacon frame to a first receiving STA.

In step S2420, the transmitting STA transmits a first frame to the first receiving STA during a Restricted Service Period (RSP).

The beacon frame includes allocation information on the RSP.

The first frame includes signaling information on an Extended RSP (ERSP) to which the RSP is extended. The first frame is transmitted when the ERSP starts.

The signaling information on the ERSP includes information on whether the ERSP is present, information on a time point at which the ERSP ends, or information on the duration of the ERSP.

The first frame is a previously defined frame, and this embodiment proposes a method for signaling the ERSP by transmitting a previously defined frame (trigger frame, TWT information frame, QoS null frame or QoS data frame described later) at the time when the ERSP starts. According to this embodiment, a STA that supports RSP (or rTWT (restricted TWT)) may not satisfy the requirements of low-latency traffic within the allocated RSP due to legacy STAs, OBSS STAs, or channel conditions that do not support RSP, so an effect of sufficiently satisfying the requirements for low-latency traffic may occur through extension of the allocated RSP.

When the first frame is a trigger frame, a method for signaling an ERSP through the trigger frame is as follows.

The trigger frame may include a common information field and a user information field. The common information field includes information on whether the ERSP is present.

When the information on whether the ERSP is present is set to 1, the user information field may be set to a user field having a specific AID value, and may include information on a time point at which the ERSP ends or information on the duration of the ERSP. The specific AID value may be set to 2008, 2009, or 2047.

A start time of the ERSP may be later than a start time of the RSP due to a transmit opportunity (TXOP) of a second receiving STA. An end time of the ERSP may be later than an end time of the RSP due to the TXOP of the second receiving STA, The ERSP may start after the TXOP of the second receiving STA ends.

In this case, the first receiving STA is an STA supporting the RSP, the second receiving STA is in the same basic service set (BSS) as the first receiving STA and is an STA that does not support the RSP.

When the first frame is a Target Wake Time (TWT) information frame, a method for signaling the ERSP through the TWT information frame is as follows.

The TWT information frame may include a TWT Flow Identifier field, an All TWT field, and a Next TWT field.

If the All TWT field is set to 1, the TWT information frame may include the information on whether the ERSP is present. If the information on whether the ERSP is present is set to 3, the Next TWT field may include the information on the time point at which the ERSP ends.

A Receiver Address (RA) field of the TWT information frame may be set to a broadcast address. That is, the TWT information frame may be transmitted in a broadcast manner.

A start time of the ERSP may be delayed from a start time of the RSP due to the TXOP of the second receiving STA. An end time of the ERSP may be later than an end time of the RSP due to the TXOP of the second receiving STA. The ERSP may start after the TXOP of the second receiving STA ends.

The first receiving STA may be an STA supporting the RSP. The second receiving STA may be in the same BSS as the first receiving STA and may be an STA that does not support the RSP.

When the first frame is a Quality of Service (QoS) null frame or a QoS data frame, a method for signaling the ERSP through the QoS null frame or the QoS data frame is as follows.

The QoS Null frame or the QoS data frame may include an A-Control field. The A-Control field may include a control identifier. When the control identifier is set to 10, the A-Control field may further include the information on the time point at which the ERSP ends or the information on the duration of the ERSP.

The QoS null frame or the QoS data frame may be transmitted in a unicast manner.

A start time of the ERSP may be delayed from a start time of the RSP due to the TXOP of the second receiving STA. An end time of the ERSP may be later than an end point of the RSP due to the TXOP of the second receiving STA. The ERSP may start after the TXOP of the second receiving STA ends.

The first receiving STA may be an STA supporting the RSP. The second receiving STA may be in the same BSS as the first receiving STA and may be an STA that does not support the RSP FIG. 25 is a flowchart illustrating a procedure in which an STA receives signaling for an ERSP according to this embodiment.

Figure 25:
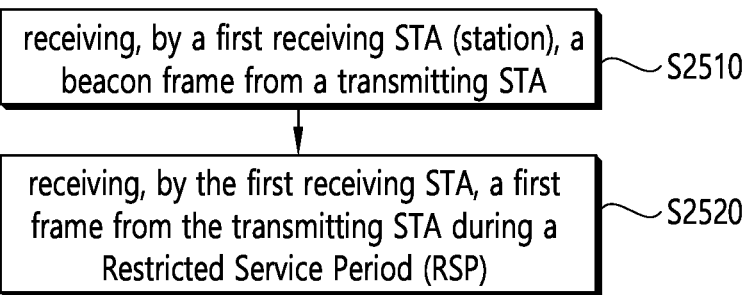
FIG. 25 is a flowchart illustrating a procedure in which an STA receives signaling for an ERSP according to this embodiment.

The example of FIG. 25 may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

This embodiment proposes a method and apparatus for extending a Restricted Service Period (RSP) proposed for low latency traffic. Since the requirement of low-latency traffic may not be satisfied within the RSP due to legacy STAs that do not support RSP, Overlapping Basic Service Set (OBSS) STAs, or channel conditions, etc., an extension or expansion of the RSP is required. Here, the transmitting STA may correspond to an Access Point Station (AP STA), and the receiving STA may correspond to a non-AP STA.

In step S2510, a first receiving station (STA) receives a beacon frame from a transmitting STA.

In step S2520, the first receiving STA receives a first frame from the transmitting STA during a Restricted Service Period (RSP).

The beacon frame includes allocation information on the RSP.

The first frame includes signaling information on an Extended RSP (ERSP) to which the RSP is extended. The first frame is transmitted when the ERSP starts.

The signaling information on the ERSP includes information on whether the ERSP is present, information on a time point at which the ERSP ends, or information on the duration of the ERSP.

The first frame is a previously defined frame, and this embodiment proposes a method for signaling the ERSP by transmitting a previously defined frame (trigger frame, TWT information frame, QoS null frame or QoS data frame described later) at the time when the ERSP starts. According to this embodiment, a STA that supports RSP (or rTWT (restricted TWT)) may not satisfy the requirements of low-latency traffic within the allocated RSP due to legacy STAs, OBSS STAs, or channel conditions that do not support RSP, so an effect of sufficiently satisfying the requirements for low-latency traffic may occur through extension of the allocated RSP.

When the first frame is a trigger frame, a method for signaling an ERSP through the trigger frame is as follows.

The trigger frame may include a common information field and a user information field. The common information field includes information on whether the ERSP is present.

When the information on whether the ERSP is present is set to 1, the user information field may be set to a user field having a specific AID value, and may include information on a time point at which the ERSP ends or information on the duration of the ERSP. The specific AID value may be set to 2008, 2009, or 2047.

A start time of the ERSP may be later than a start time of the RSP due to a transmit opportunity (TXOP) of a second receiving STA. An end time of the ERSP may be later than an end time of the RSP due to the TXOP of the second receiving STA, The ERSP may start after the TXOP of the second receiving STA ends.

In this case, the first receiving STA is an STA supporting the RSP, the second receiving STA is in the same basic service set (BSS) as the first receiving STA and is an STA that does not support the RSP.

When the first frame is a Target Wake Time (TWT) information frame, a method for signaling the ERSP through the TWT information frame is as follows.

The TWT information frame may include a TWT Flow Identifier field, an All TWT field, and a Next TWT field.

If the All TWT field is set to 1, the TWT information frame may include the information on whether the ERSP is present. If the information on whether the ERSP is present is set to 3, the Next TWT field may include the information on the time point at which the ERSP ends.

A Receiver Address (RA) field of the TWT information frame may be set to a broadcast address. That is, the TWT information frame may be transmitted in a broadcast manner.

A start time of the ERSP may be delayed from a start time of the RSP due to the TXOP of the second receiving STA. An end time of the ERSP may be later than an end time of the RSP due to the TXOP of the second receiving STA. The ERSP may start after the TXOP of the second receiving STA ends.

The first receiving STA may be an STA supporting the RSP. The second receiving STA may be in the same BSS as the first receiving STA and may be an STA that does not support the RSP.

When the first frame is a Quality of Service (QoS) null frame or a QoS data frame, a method for signaling the ERSP through the QoS null frame or the QoS data frame is as follows.

The QoS Null frame or the QoS data frame may include an A-Control field. The A-Control field may include a control identifier. When the control identifier is set to 10, the A-Control field may further include the information on the time point at which the ERSP ends or the information on the duration of the ERSP.

The QoS null frame or the QoS data frame may be transmitted in a unicast manner.

A start time of the ERSP may be delayed from a start time of the RSP due to the TXOP of the second receiving STA. An end time of the ERSP may be later than an end point of the RSP due to the TXOP of the second receiving STA. The ERSP may start after the TXOP of the second receiving STA ends.

The first receiving STA may be an STA supporting the RSP. The second receiving STA may be in the same BSS as the first receiving STA and may be an STA that does not support the RSP The technical features of the present disclosure may be applied to various devices and methods. For example, the technical features of the present disclosure may be performed/supported through the device(s) of FIG. 1 and/or FIG. 11. For example, the technical features of the present disclosure may be applied to only part of FIG. 1 and/or FIG. 11. For example, the technical features of the present disclosure may be implemented based on the processing chip(s) 114 and 124 of FIG. 1, or implemented based on the processor(s) 111 and 121 and the memory(s) 112 and 122, or implemented based on the processor 610 and the memory 620 of FIG. 11. For example, the device according to the present disclosure receives a beacon frame from a transmitting station (STA); and receives a first frame from the transmitting STA during a Restricted Service Period (RSP).

The technical features of the present disclosure may be implemented based on a computer readable medium (CRM). For example, a CRM according to the present disclosure is at least one computer readable medium including instructions designed to be executed by at least one processor.

The CRM may store instructions that perform operations including receiving a beacon frame from a transmitting station (STA); and receiving a first frame from the transmitting STA during a Restricted Service Period (RSP). At least one processor may execute the instructions stored in the CRM according to the present disclosure. At least one processor related to the CRM of the present disclosure may be the processor 111, 121 of FIG. 1, the processing chip 114, 124 of FIG. 1, or the processor 610 of FIG. 11. Meanwhile, the CRM of the present disclosure may be the memory 112, 122 of FIG. 1, the memory 620 of FIG. 11, or a separate external memory/storage medium/disk.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless local area network (WLAN) system, the method comprising:

receiving, by a first receiving STA (station), a beacon frame from a transmitting STA; and receiving, by the first receiving STA, a trigger frame from the transmitting STA during a Restricted Service Period (RSP), wherein the beacon frame includes allocation information on the RSP, wherein the trigger frame includes a common information field and a user information field, wherein the common information field includes information on whether an Extended RSP (ERSP) to which the RSP is extended is present, wherein the trigger frame is transmitted when the ERSP starts, and wherein based on the information on whether the ERSP is present being set to 1, the user information field is set to a user field having a specific AID value, and includes information on a time point at which the ERSP ends or information on the duration of the ERSP.

2. The method of claim 1, wherein the specific AID value is set to 2008, 2009, or 2047.

3. The method of claim 2, wherein a start time of the ERSP is later than a start time of the RSP due to a transmit opportunity, TXOP, of a second receiving STA, wherein an end time of the ERSP is later than an end time of the RSP due to the TXOP of the second receiving STA, wherein the ERSP starts after the TXOP of the second receiving STA ends.

4. The method of claim 3, wherein the first receiving STA is an STA supporting the RSP, wherein the second receiving STA is in the same basic service set (BSS) as the first receiving STA and is an STA that does not support the RSP.

5. The method of claim 1, wherein a start time of the ERSP is delayed from a start time of the RSP due to a TXOP of a second receiving STA, wherein an end time of the ERSP is later than an end point of the RSP due to the TXOP of the second receiving STA, wherein the ERSP starts after the TXOP of the second receiving STA ends, wherein the first receiving STA is an STA supporting the RSP, wherein the second receiving STA is in the same BSS as the first receiving STA and is an STA that does not support the RSP.

6. A first receiving station (STA) in a wireless local area network (WLAN) system, the receiving STA comprising:

a memory;

a transceiver; and a processor operatively coupled to the memory and the transceiver, wherein processor is configured to:

receive a beacon frame from a transmitting STA; and receive a trigger frame from the transmitting STA during a Restricted Service Period (RSP), wherein the beacon frame includes allocation information on the RSP, wherein the trigger frame includes a common information field and a user information field, wherein the common information field includes information on whether an Extended RSP (ERSP) to which the RSP is extended is present, wherein the trigger frame is transmitted when the ERSP starts, and wherein based on the information on whether the ERSP is present being set to 1, the user information field is set to a user field having a specific AID value, and includes information on a time point at which the ERSP ends or information on the duration of the ERSP.

7. A method in a wireless local area network (WLAN) system, the method comprising:

transmitting, by a transmitting station (STA), a beacon frame to a first receiving STA; and transmitting, by the transmitting STA, a trigger frame to the first receiving STA during a Restricted Service Period (RSP), wherein the beacon frame includes allocation information on the RSP, wherein the trigger frame includes a common information field and a user information field, wherein the common information field includes information on whether an Extended RSP, ERSP, to which the RSP is extended is present, wherein the trigger frame is transmitted when the ERSP starts, and wherein based on the information on whether the ERSP is present being set to 1, the user information field is set to a user field having a specific AID value, and includes information on a time point at which the ERSP ends or information on the duration of the ERSP.

8. The method of claim 7, wherein the specific AID value is set to 2008, 2009, or 2047.

9. The method of claim 8, wherein a start time of the ERSP is later than a start time of the RSP due to a transmit opportunity (TXOP) of a second receiving STA, wherein an end time of the ERSP is later than an end time of the RSP due to the TXOP of the second receiving STA, wherein the ERSP starts after the TXOP of the second receiving STA ends, wherein the first receiving STA is an STA supporting the RSP, wherein the second receiving STA is in the same basic service set (BSS) as the first receiving STA and is an STA that does not support the RSP.

* * * * *